(12) United States Patent
Lee

(10) Patent No.: US 11,973,933 B1
(45) Date of Patent: *Apr. 30, 2024

(54) METHOD FOR ENCODING/DECODING AN INTRA-PICTURE PREDICTION MODE USING TWO INTRA-PREDICTION MODE CANDIDATE, AND APPARATUS USING SUCH A METHOD

(71) Applicant: Dolby Laboratories Licensing Corporation, San Francisco, CA (US)

(72) Inventor: Sun Young Lee, Seoul (KR)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/971,930

(22) Filed: Oct. 24, 2022

Related U.S. Application Data

(63) Continuation of application No. 17/315,598, filed on May 10, 2021, now Pat. No. 11,516,461, which is a
(Continued)

(51) Int. Cl.
*H04N 19/00* (2014.01)
*H04N 19/103* (2014.01)
(Continued)

(52) U.S. Cl.
CPC ........... *H04N 19/103* (2014.11); *H04N 19/11* (2014.11); *H04N 19/176* (2014.11); *H04N 19/463* (2014.11); *H04N 19/70* (2014.11)

(58) Field of Classification Search
CPC ........... H04N 19/00763; H04N 19/176; H04N 19/463; H04N 19/11; H04N 19/70; H04N 19/103
See application file for complete search history.

(56) References Cited

U.S. PATENT DOCUMENTS

2006/0120450 A1 6/2006 Han et al.
2011/0243227 A1 10/2011 Yoneji et al.
(Continued)

FOREIGN PATENT DOCUMENTS

KR 10-2006-0063532 6/2006
KR 10-2007-0005848 1/2007
(Continued)

OTHER PUBLICATIONS

Wiegand et al., "WD3: Working Draft 3 of High-Efficiency Video Coding," JCTVC-E603, Geneva, CH, Mar. 2011, vol. 16, No. 23 (215 pages).
(Continued)

*Primary Examiner* — Zhihan Zhou
(74) *Attorney, Agent, or Firm* — Michael Best & Friedrich LLP

(57) ABSTRACT

The method for decoding an intra-picture prediction mode includes the steps of: determining whether the intra-picture prediction mode of a current prediction unit is identical to a first intra-picture prediction mode candidate or a second intra-picture prediction mode candidate based on bit information: and when the intra-picture prediction mode of the current prediction unit is identical to the first intra-picture prediction mode candidate and/or to the second intra-picture prediction mode candidate, determining whether the first intra-picture prediction mode candidate or the second intra-picture prediction mode candidate is identical to the intra-picture prediction mode of the current prediction unit on the basis of additional bit information, and decoding the intra-picture prediction mode of the current prediction unit.

3 Claims, 8 Drawing Sheets

Related U.S. Application Data continuation of application No. 16/780,190, filed on Feb. 3, 2020, now Pat. No. 11,032,540, which is a continuation of application No. 16/360,311, filed on Mar. 21, 2019, now Pat. No. 10,708,579, which is a continuation of application No. 15/826,479, filed on Nov. 29, 2017, now Pat. No. 10,284,841, which is a continuation of application No. 14/348,840, filed as application No. PCT/KR2012/007305 on Sep. 12, 2012, now Pat. No. 9,918,083.

(51) Int. Cl.
*H04N 19/11* (2014.01)
*H04N 19/176* (2014.01)
*H04N 19/463* (2014.01)
*H04N 19/70* (2014.01)

(56) References Cited

U.S. PATENT DOCUMENTS

| | | | | |
|---|---|---|---|---|
| 2012/0177113 A1* | 7/2012 | Guo | ............... | H04N 19/196 |
| | | | | 375/E7.243 |
| 2012/0314766 A1* | 12/2012 | Chien | ............... | H04N 19/11 |
| | | | | 375/E7.243 |
| 2013/0266064 A1* | 10/2013 | Zhang | ............... | H04N 19/61 |
| | | | | 375/240.12 |
| 2014/0086323 A1* | 3/2014 | Chuang | ............... | H04N 19/70 |
| | | | | 375/240.12 |
| 2014/0119439 A1* | 5/2014 | Guo | ............... | H04N 19/70 |
| | | | | 375/240.12 |
| 2014/0140404 A1* | 5/2014 | Liu | ............... | H04N 19/147 |
| | | | | 375/240.12 |

FOREIGN PATENT DOCUMENTS

| | | |
|---|---|---|
| KR | 10-0871588 B1 | 12/2008 |
| KR | 10-2009-0075767 | 7/2009 |
| WO | 2010/067529 A1 | 6/2010 |
| WO | 2012/171463 A1 | 12/2012 |
| WO | 2013/000324 A1 | 1/2013 |
| WO | 2013/023518 A1 | 2/2013 |
| WO | 2013/039676 A1 | 3/2013 |

OTHER PUBLICATIONS

International Search Report dated Feb. 13, 2013 for Application No. PCT/KR2012/007305.
Non-Final Office Action dated Jun. 7, 2016 from USPTO for U.S. Appl. No. 14/348,840.
Final Office Action dated Nov. 10, 2016 from USPTO for U.S. Appl. No. 14/348,840.
Non-Final Office Action dated Jul. 5, 2017 from USPTO for U.S. Appl. No. 14/348,840.
Non-Final Office Action dated Aug. 12, 2019 from USPTO for U.S. Appl. No. 16/360,311.
Notice of Allowance dated Nov. 1, 2019 from USPTO for U.S. Appl. No. 16/360,311.
Non-Final Office Action dated Jul. 5, 2018 from USPTO for U.S. Appl. No. 15/826,479.
Notice of Allowance dated Dec. 17, 2018 from USPTO for U.S. Appl. No. 15/826,479.
Non-Final Office Action dated Sep. 21, 2020 from USPTO for U.S. Appl. No. 16/780,190.
Notice of Allowance dated Feb. 9, 2021 from USPTO for U.S. Appl. No. 16/780,190.
Non-Final Rejection dated Mar. 17, 2022 from USPTO for U.S. Appl. No. 17/315,598.
Notice of Allowance dated Jul. 27, 2022 from USPTO for U.S. Appl. No. 17/315,598.

* cited by examiner

METHOD FOR ENCODING/DECODING AN INTRA-PICTURE PREDICTION MODE USING TWO INTRA-PREDICTION MODE CANDIDATE, AND APPARATUS USING SUCH A METHOD

CROSS-REFERENCE TO RELATED APPLICATION

This a continuation of U.S. application Ser. No. 17/315,598, filed on May 10, 2021, which is a continuation of U.S. application Ser. No. 16/780,190, filed Feb. 3, 2020, now issued as U.S. Pat. No. 11,032,540, which is a continuation of U.S. application Ser. No. 16/360,311, filed Mar. 21, 2019, now issued as U.S. Pat. No. 10,708,579, which is a continuation of U.S. application Ser. No. 15/826,479, filed Nov. 29, 2017, now issued as U.S. Pat. No. 10,284,841, which is a continuation of U.S. patent application Ser. No. 14/348,840, filed Mar. 31, 2014, now issued as U.S. Pat. No. 9,918,083, which is a National Stage Entry of International Application PCT/KR2012/007305, filed on Sep. 12, 2012, and claims priority from and the benefit of Korean Patent Application No. 10-2011-0101816, filed Oct. 6, 2011, the disclosures of which are incorporated herein by reference in their entireties.

BACKGROUND OF THE INVENTION

Field of the Invention

The present invention relates to to an encoding/decoding method and apparatus, and more particularly, an intra-prediction mode encoding/decoding method using two candidate intra-prediction modes and an apparatus using the same.

Related Art

Recently, demand for high resolution and high quality images such as a high definition (HD) image and an ultra-high definition (HUD) image have been increased in various applications fields. As video data has higher resolution and higher quality, an amount of data is increased, relative to existing video data, and thus, transmission of video data by using a medium such as an existing wired/wireless a wideband circuit or by using an existing storage medium increases transmission costs and storage costs. In order to address the above problems arising as video data has higher resolution and higher quality, highly efficient video compression techniques may be utilized.

Video compression techniques include various techniques such as an inter-prediction technique of predicting pixel values included in a current picture from a previous or subsequent picture of the current picture, an intra-prediction technique of predicting pixel values included in a current picture by using pixel information of the current picture, an entropy encoding technique of allocating a short sign to a value having high appearance frequency and allocating a long sign to a value having low appearance frequency, and the like, and video data may be effectively compressed and transmitted or stored by using such video compression techniques.

SUMMARY OF THE INVENTION

An aspect of the present invention is to provide a video decoding method to perform intra-prediction based on a fixed number of candidate intra-prediction modes to increase a video coding efficiency.

Another aspect of the present invention is to provide an apparatus of performing a video decoding method to perform intra-prediction based on a fixed number of candidate intra-prediction modes to increase a video coding efficiency.

An embodiment of the present invention provides an intra-prediction mode decoding method may include: determining whether an intra-prediction mode of a current prediction unit (PU) is identical to a first candidate intra-prediction mode or a second candidate intra-prediction mode based on n-bit information; and when the intra-prediction mode of the current PU is identical to at least one of the first candidate intra-prediction mode and the second candidate intra-prediction mode, determining which one of the first candidate intra-prediction mode and the second candidate intra-prediction mode, the intra-prediction mode of the current PU is identical to, based on additional m-bit information, and decoding the intra-prediction mode of the current PU.

The intra-prediction mode decoding method may further include: when the intra-prediction mode of the current PU is not identical to at least one of the first candidate intra-prediction mode and the second candidate intra-prediction mode, decoding the intra-prediction mode of the current PU based on additional bit specifying remaining intra-prediction mode information.

The intra-prediction mode decoding method may further include: when the intra-prediction mode value of the current PU is greater than at least one of the first candidate intra-prediction mode value and the second candidate intra-prediction mode value, changing a codeword mapped to the intra-prediction mode value of the current PU.

When at least one of the first candidate intra-prediction mode and the second candidate intra-prediction mode is not derived from a neighbor PU of the current PU, a planar mode and a DC mode are sequentially set to at least one of the first candidate intra-prediction mode and the second candidate intra-prediction mode not derived from the neighbor PU of the current PU, so that the first candidate intra-prediction mode and the second candidate intra-prediction mode have different intra-prediction mode values.

when a first neighbor PU and a second neighbor PU of the current PU are available neighbor PUs, and intra-prediction mode values of the first neighbor PUs and the second neighbor PU is identical, an intra-prediction mode value of the first neighbor PU or an intra-prediction mode value of the second neighbor PU is set to a first candidate intra-prediction mode, and when one of the first neighbor PU and the second neighbor PU is available, an intra-prediction mode value of the available neighbor PU may be set as a first candidate intra-prediction mode, and when the first candidate intra-prediction mode is not a planar mode, the second candidate intra-prediction mode may be set as the planar mode, and when the first candidate intra-prediction mode is the planar mode, the second candidate intra-prediction mode may be set as a DC mode.

When neither of the first neighbor PU and the second neighbor PU of the current PU is available, the first candidate intra-prediction mode may be set as the planar mode and the second candidate intra-prediction mode may be set as the DC mode.

The intra-prediction mode decoding method may further include: if the number of intra-prediction modes used in the current PU is equal to or smaller than a predetermined number, calculating intra-prediction mode information of the current PU based on a codeword directly mapped to the intra-prediction mode, without determining the first candidate intra-prediction mode and the second candidate intra-prediction mode.

The determining of whether the intra-prediction mode of the current PU is identical to the first candidate intra-prediction mode or the second candidate intra-prediction mode based on n-bit information may include: when at least one of the first candidate intra-prediction mode value and the second candidate intra-prediction mode value is greater than the number of intra-prediction modes available in the current PU, mapping at least one candidate intra-prediction mode value greater than the number of intra-prediction modes available in the current PU to the intra-prediction mode value available in the current PU by using a predetermined mapping table.

The predetermined mapping table may be set so that a probability that at least one candidate intra-prediction mode value greater than the number of intra-prediction modes available in the current PU is mapped to the planar mode is high.

The predetermined mapping table may be set so that a probability that at least one candidate intra-prediction mode value greater than the number of intra-prediction modes available in the current PU is mapped to the DC mode is high.

In the present patent application, numerals n and m may be 1.

Another embodiment of the present invention provides a decoder may include: an entropy decoding module configured to decode information regarding whether an intra-prediction mode of a current prediction unit (PU) is identical to a first candidate intra-prediction mode or a second candidate intra-prediction mode based on n-bit information included in a predetermined bit stream, decode information regarding as to which one of the first candidate intra-prediction mode and the second candidate intra-prediction mode, the intra-prediction mode of the current PU is identical to, based on additional m-bit information, when the intra-prediction mode of the current PU is identical to at least one of the first candidate intra-prediction mode and the second candidate intra-prediction mode, and decode the intra-prediction mode of the current PU based on an additional bit specifying remaining intra-prediction mode information, when the intra-prediction mode of the current PU is not identical to at least one of the first candidate intra-prediction mode and the second candidate intra-prediction mode; and a prediction module configured to perform intra-prediction based on the intra-prediction mode of the current PU decoded by the entropy decoding module.

When at least one of the first candidate intra-prediction mode and the second candidate intra-prediction mode are not derived from a neighbor PU of the current PU, a planar mode and a DC mode are sequentially set to at least one of the first candidate intra-prediction mode and the second candidate intra-prediction mode not derived from the neighbor PU of the current PU such that the first candidate intra-prediction mode and the second candidate intra-prediction mode have different intra-prediction mode values.

A first neighbor PU and a second neighbor PU of the current PU are available neighbor PUs, and the first intra-prediction mode values of the available neighbor PU and the second neighbor PU is identical, an intra-prediction mode value of the first neighbor PU or an intra-prediction mode value of the second neighbor PU is set to a first candidate intra-prediction mode, and when one of the first neighbor PU and the second neighbor PU is available, an intra-prediction mode value of the available neighbor PU may be set as a first candidate intra-prediction mode, and when the first candidate intra-prediction mode is not a planar mode, the second candidate intra-prediction mode may be set as the planar mode, and when the first candidate intra-prediction mode is the planar mode, the second candidate intra-prediction mode may be set as a DC mode.

When at least one of the first candidate intra-prediction mode value and the second candidate intra-prediction mode value is greater than the number of intra-prediction modes available in the current PU, the prediction module may map at least one candidate intra-prediction mode value greater than the number of the intra-prediction modes available in the current PU to the intra-prediction mode value available in the current PU to perform intra-prediction on the current PU.

The predetermined mapping table may be set so that a probability that at least one candidate intra-prediction mode value greater than the number of intra-prediction modes available in the current PU is set mapped to the planar mode is high.

In the present patent application, numerals n and m may be 1.

As described above, according to the intra-prediction mode encoding/decoding method using two candidate intra-prediction modes and an apparatus using the same, an intra-prediction mode of a current prediction unit (PU) may be expressed by using a short codeword and, by specifying the intra-prediction mode of the current PU by using a fixed number of candidate intra-prediction modes, coding efficiency may be enhanced and complexity may be reduced.

DESCRIPTION OF EMBODIMENTS

The present invention may be modified variably and may have various embodiments, particular examples of which will be illustrated in drawings and described in detail. However, it is to be understood that the present invention is not limited to a specific disclosed form, but includes all modifications, equivalents, and substitutions without departing from the scope and spirit of the present invention. In describing drawings, like numbers refer to like elements.

While terms such as "first" and "second," etc., may be used to describe various components, such components must not be understood as being limited to the above terms. The above terms are used only to distinguish one component from another. For example, a first component may be referred to as a second component without departing from the scope of rights of the present invention, and likewise a second component may be referred to as a first component. Terms of "and/or" include a combination of items described in relation to plural forms or any one of items described in relation to plural forms.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Other expressions describing a relationship between components, that is, "between", "directly between", "neighboring to", "directly neighboring to" and the like, should be similarly interpreted.

Terms used in the present specification are used only in order to describe specific embodiments rather than limiting the present invention. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Hereinafter, the embodiments of the present invention will be described with reference to the accompanying drawings, in which like numbers refer to like elements throughout, and a redundant description of the same elements will be omitted.

Figure 1:
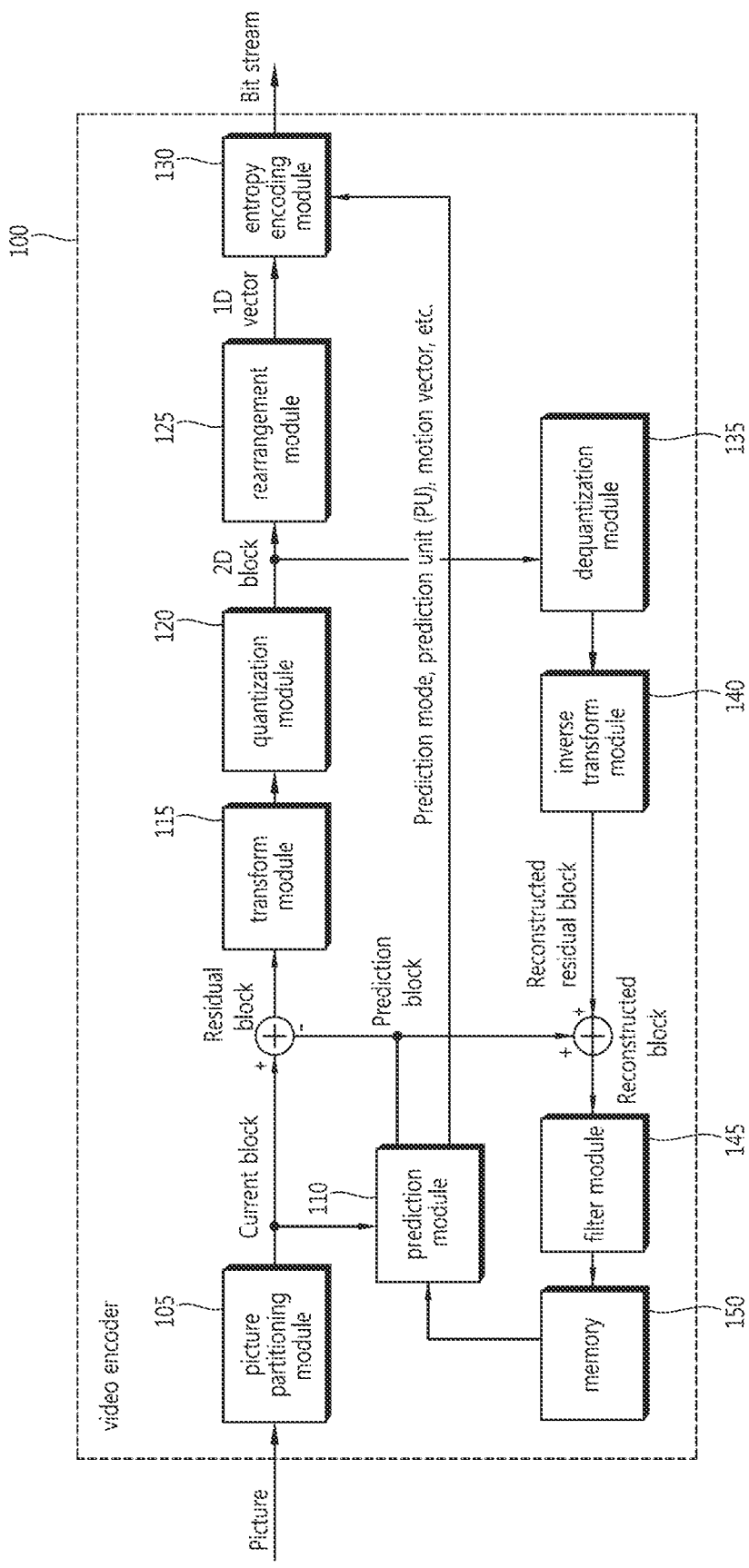
FIG. 1 is a block diagram illustrating a video encoding apparatus according to an embodiment of the present invention.

FIG. 1 is a block diagram illustrating a video encoding apparatus according to an embodiment of the present invention.

Referring to FIG. 1, the video encoding apparatus 100 may include a picture partitioning module 105, a prediction module 110, a transform module 115, a quantization module 120, a rearrangement module 125, an entropy encoding module 130, a dequantization module 135, an inverse-transform module 140, a filter module 145, and a memory 150.

The elements in FIG. 1 are illustrated independently to denote mutually different characteristic functions in the video encoding apparatus, which does not mean that each element is configured as separated hardware or a single software constituent unit. Namely, the elements are arranged as individual elements for the description purpose, and at least two of the elements may be incorporated into a single element or a single element may be divided into a plurality of elements to perform functions, and an embodiment in which elements are integrated or an embodiment in which an element is divided may be included in coverage of the present invention as long as it is not departed from the scope and spirit of the present invention.

Also, some of the elements may be optional to simply improve performance, rather than essential ones to perform an intrinsic function in the present invention. The present invention may be implemented by including only requisite elements for implementing the essence of the present invention, excluding element(s) used to merely enhance performance, and a structure including only the essential elements, excluding selective elements used to merely enhance performance may also be included in coverage of the present invention.

The picture partitioning module 105 may partition input picture into at least one processing unit. In this case, the processing unit may be a prediction unit (PU), a transform unit (TU), or a coding unit (CU). The picture partitioning module 105 may partition a single picture into a plurality of combinations of coding unit (CU), prediction unit (PU), and transform unit (TU) and select one of combinations of CU, PU, and TU based on a predetermined reference (for example, a cost function), to encode a picture.

For example, a picture may be partitioned into a plurality of coding units (CUs). In order to partition a picture into CUs, a recursive tree structure such as a quad tree structure may be used. A CU to be partitioned into coding units based on a single picture or a CU having a maximum size as a root may be partitioned with child nodes corresponding to the number of partitioned CUs. A CU that may not be partitioned any more according to a predetermined limitation is a leaf node. Namely, in a case in which a single CU is partitioned into only square units, the single CU may be partitioned into a maximum of four different CUs.

In the embodiment described hereinafter, a CU may also be referred to a unit for decoding, as well as a unit for encoding.

A prediction unit (PU) may be partitioned into at least one square or rectangular shape having the same size within a single CU. Further, a plurality of PUs partitioned from a single CU have a different shape each other.

In generating a PU performing intra-prediction based on a CU, if it is not a minimum CU, intra-prediction may be performed without partitioning into a plurality of PUs (N×N).

The prediction module 110 may include an inter-prediction module performing inter-prediction and an intra-prediction module performing intra-prediction. Whether inter-prediction or intra-prediction applied with respect to a PU may be determined, and detailed information (for example, an intra-prediction mode, a motion vector, a reference picture, and the like) corresponding to each prediction method may be determined. Here, a processing unit for performing prediction and a processing unit for determining a prediction method and specific content may be different. For example, a prediction method, a prediction mode, or the like, may be determined by a prediction unit (PU), and prediction may be performed by a transform unit (TU). A residual value (residual block) between a generated prediction block and an original block may be input to the transform module 115. Also, prediction mode information, motion vector information, and the like, used for prediction may be encoded, as well as the residual value, by the entropy encoding module 130 and transmitted to a decoder. In case of using a specific encoding mode, the original block may be encoded as it is and transmitted to a decoder, without generating a prediction block through the prediction module 110.

The inter-prediction module may predict a PU based on information of at least one picture among a previous picture or a subsequent picture of a current picture. The inter-prediction module may include a reference picture interpolation module, a motion estimation module, and a motion compensation module.

The reference picture interpolation module may receive reference picture information from the memory 150 and generate pixel information below integer pixels from the reference picture. In case of a luma pixel, a OCT-based 8-tap interpolation filter having different filter coefficients to generate pixel information below integer pixels by ¼ pixels may be used. In case of a chroma pixel, a DOT-based 4-tap interpolation filter having different filter coefficients to generate pixel information below integer pixels by 18 pixels may be used.

The motion estimation module may perform motion estimation based on a reference picture interpolated by the reference picture interpolation module. In order to derive a motion vector, various methods such as a full search-based block matching algorithm (FBMA), a three step search (TSS), a new three-step search algorithm (NTS), or the like, may be used. A motion vector may have a motion vector value in units of ½ or ¼ pixels based on interpolated pixels. The motion estimation module may predict a current prediction unit (PU) by using different motion prediction methods. Various methods such as a skip method, a merge method, an advanced motion vector prediction (AMVP) method, and the like, may be used as a motion prediction method.

The intra-prediction unit may generate a PU based on reference pixel information neighboring a current block as pixel information within a current picture. When a neighbor block of a current PU is a block on which inter-prediction has been performed and then a reference pixel is a pixel on which inter-prediction has been performed, a reference pixel included in the block on which inter-prediction has been performed may be replaced with reference pixel information of a neighbor block on which intra-prediction has been performed. That is, when a reference pixel is not available, the unavailable reference pixel information may be replaced with at least one reference pixel among available reference pixels.

In intra-prediction, a prediction mode may be a directional prediction mode in which reference pixel information is used according to a prediction direction and a non-directional mode in which directional information is not used in performing prediction. A prediction mode for lura information and a prediction mode for chroma information may be different, and in order to predict chroma information, intra-prediction mode information for luma information and predicted luma signal information may be utilized.

In performing intra-prediction, when a size of a prediction unit (PU) and a size of a transform unit (TU) are equal, intra-prediction for a prediction unit (PU) is performed on based on pixels located on the left of the prediction unit (PU), pixels located on left-upper of the prediction unit (PU), and pixels located on upper of the prediction unit (PU) However, in performing intra-prediction, when a size of a prediction unit (PU) and a size of a transform unit (TU) are different, intra-prediction may be performed by using a reference pixel based on the transform unit (TU). Also, intra-prediction using N×N partition may be used only on a minimum CU.

In the intra-prediction method, after an adaptive intra-smoothing (AIS) filter may be applied to a reference pixel according to a prediction mode, a prediction block may be generated. Types of AIS filter applied to the reference pixel may vary. In order to perform the intra-prediction method, an intra-prediction mode of a current PU may be predicted using an intra-prediction mode of a PU neighboring the current prediction unit. When a prediction mode of the current PU is predicted by using mode information for a neighbor PU, if intra-prediction modes of the current PU and the prediction modes of the neighbor PU are identical, information indicating that the prediction modes of the current PU and the neighbor PU are identical may be transmitted by using predetermined flag information. And if the prediction modes of the current PU and the prediction modes of the neighbor PU are different, entropy encoding may be performed to encode prediction mode information of a current block.

The prediction unit may derive intra-prediction mode information of the current PU by using a predetermined binary code based on the intra-coding mode encoding method according to an embodiment of the present invention described with reference to FIGS. 3 through 8 hereinafter.

Also, a residual block including residual information as a difference value between a PU generated by the prediction module 110 and the original block corresponding to the PU may be generated. The generated residual block may be input to the transform module 115. The transform module 115 may transform the residual block including the residual value information based on the original block and the PU generated by the prediction module 110 using a transform method such as discrete cosine transform (DOT) or discrete sine transform (DST). Whether to apply DOT or DST to transform the residual block may be determined based on intra-prediction mode information of the PU.

The quantization module 120 may quantize values which have been transformed into a frequency domain by the transform module 115. A quantization coefficient may vary according to a block or importance of a picture. A value output from the quantization module 120 may be provided to the dequantization module 135 and the rearrangement module 125.

The rearrangement module 125 may rearrange the quantized residual value.

The rearrangement module 125 may change coefficients of a two-dimensional (2D) block type into a one-dimensional (1D) vector through a coefficient scanning method. For example, the rearrangement module 125 may scan from a DC coefficient up to a coefficient of a high frequency domain by using a zigzag scan method to change them into a 1D vector form. According to a size of a TU and an intra-prediction mode, a vertical scan method which scans 2D block type coefficients in a column direction or a horizontal scan method which scann 2D block type coefficients in a row direction, rather than the zigzag scan method, may be used. Namely, which one of the zigzag scan method, the vertical scan method, and the horizontal scan method may be determined according to a size of a TU and an intra-prediction mode.

The entropy encoding module 130 may perform entropy encoding based on the values output from the rearrangement module 125. For example, various encoding methods such as exponential Golomb, context-adaptive variable length coding (CAVLC), and context-adaptive binary arithmetic coding (CABAC) may be used as entropy encoding.

The entropy encoding module 130 may encode a plurality of information such as residual value coefficient information of a CU and block type information, prediction mode information, partition unit information, PU information and transmission unit information, motion vector information, reference picture information, block interpolation information, filtering information, and the like, from the rearrangement module 125 and the prediction module 110.

The entropy encoding module 130 may entropy-encode a coefficient value of a CU input from the rearrangement module 125.

The entropy encoding module 130 may store a table for performing entropy coding such as a variable length coding table, and perform entropy coding by sing the stored variable length coding table. In performing entropy coding, a codeword allocation with respect to a code number of corresponding information may be changed by using a method using a counter on a partial codeword included in a table or a direct swapping method. For example, in case of some higher code numbers to which a smaller number of bits are allocated in a table in which code numbers and codewords are mapped, a mapping order of the table in which codewords and code numbers are mapped may be adaptively changed such that a short codeword is allocated to a code number having the largest number of times of adding up code numbers by using a counter. When the number counted by the counter reaches a predetermined threshold value, the counted number recorded in the counter may be halved and counting may be performed again.

In case of a code number in the table which has not been counted, when information corresponding to the code number is generated by the direct swapping method, it is swapped with an immediately above code number to reduce the number of bits allocated to the corresponding code number to thus perform entropy coding.

The entropy coding module may express intra-prediction mode information of a current PU by using a predetermined binary code based on the intra-coding mode encoding method according to the embodiment of the present invention described with reference to FIGS. 3 through 8.

The dequantization module 135 and the inverse-transform module 140 may dequantize the values quantized by the quantization module 120 and inverse-transforms values transformed by the transform module 115, Residual values generated by the dequantization module 135 and the inverse-transform module 140 may be added with the PU predicted through the motion estimation module, the motion compensation module, and the intra-prediction module included in the prediction module to generate a reconstructed block.

The filter module 145 may include at least one of a deblocking filter, an offset compensation module, and an adaptive loop filter (ALF).

The deblocking filter 145 may remove block distortion generated due to a boundary between blocks in the reconstructed picture. Whether to apply a deblocking filter to a current block may be determined based on pixels included in some columns and rows included in a block. When the deblocking filter is applied to the block, a strong filter or a weak filter may be selected according to strength of required deblocking filtering. Also, in applying the deblocking filter, when vertical filtering and horizontal filtering are performed, horizontal directional filtering and vertical directional filtering may be processed in parallel.

The offset compensation module may compensate for an offset with an original picture with respect to a deblocked image by a pixel. In order to perform offset compensation on a picture, a method of partitioning pixels included in the picture into a predetermined number of regions, determining a region in which offset is to be performed, and applying offset to the corresponding region, or a method of applying offset in consideration of edge information of each pixel may be used.

The ALF may perform filtering based on a value obtained by comparing the filtered reconstructed image and the original image. Pixels included in an image may be divided into a predetermined group, a filter to be applied to a corresponding group may be determined to differentially filtering each group. Information regarding whether to apply the ALF may be transmitted by coding unit (CU), and a size and a coefficient of the ALF to be applied may be vary according to each block. The ALF may have various shapes, and the number of coefficients included in the filter may also vary. Filtering-related information (filter coefficient information, ALF ON/OFF information, filter shape information) of the ALF may be included in a predetermined parameter set in a bit stream and transmitted.

The memory 150 may store a reconstructed block or picture output from the filter module 145, and the stored reconstruction block or picture may be provided to the prediction module 110 when inter-prediction is performed.

Figure 2:
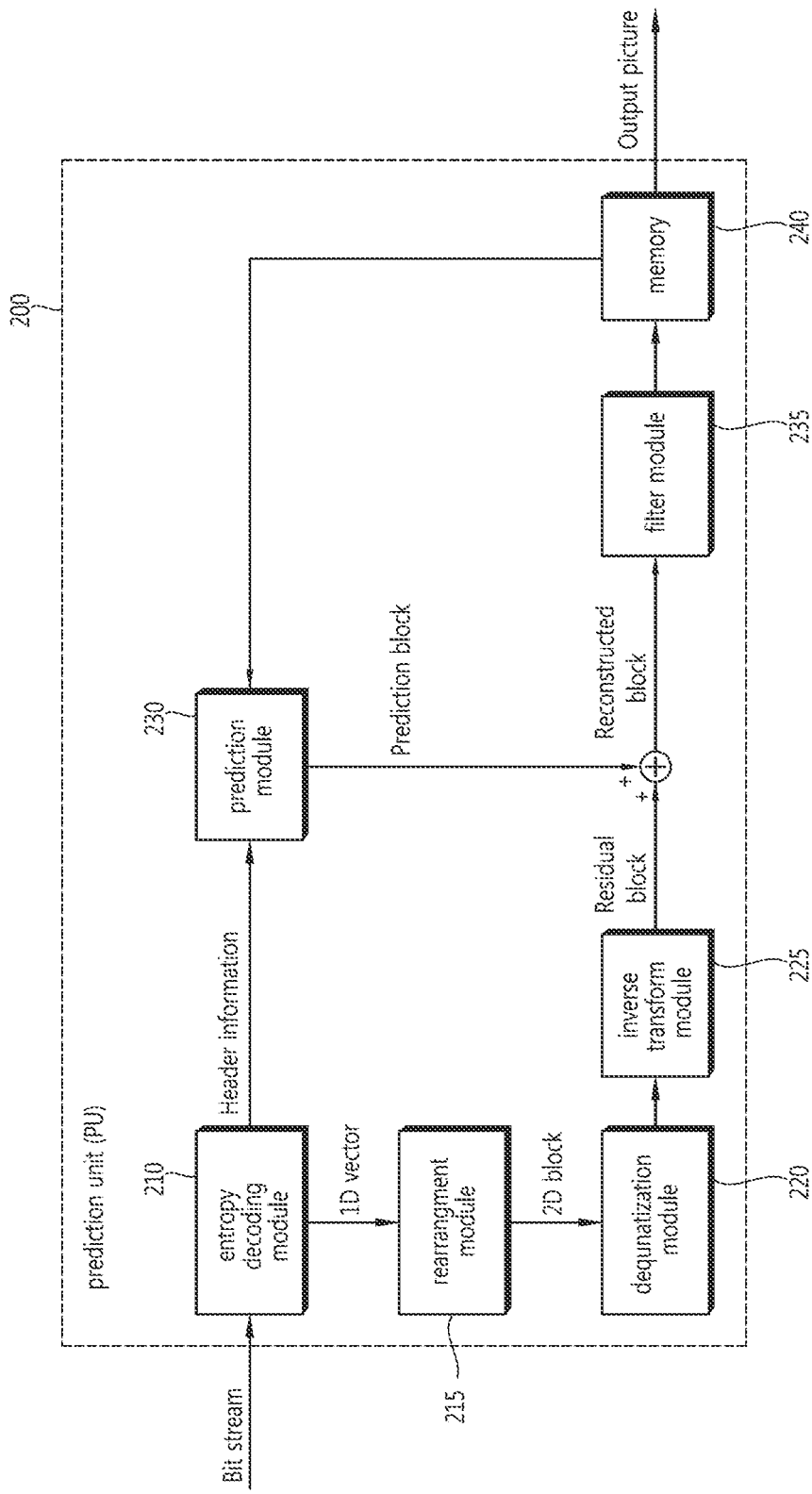
FIG. 2 is a block diagram illustrating a video decoder according to another embodiment of the present invention.

FIG. 2 is a block diagram illustrating a video decoder according to another embodiment of the present invention.

Referring to FIG. 2, a video decoder 200 may include an entropy decoding module 210, a rearrangement module 215, a dequantization module 220, an inverse-transform module 225, a prediction module 230, a filter module 235, and a memory 240.

When a video bit stream is input to the video encoder, the input bit stream may be decoded in a procedure opposite to that of the video encoder.

The entropy decoding module 210 may perform entropy decoding in a procedure opposite to that of the entropy coding by the entropy coding module of the video coder. For example, a VLC table used to perform entropy coding may be implemented as the same variable length coding table also in the entropy decoding unit to perform entropy encoding. Information for generating a prediction block, among the information decoded by the entropy decoding module 210 may be provided to the prediction module 230, and the residual value obtained after performing the entropy decoding by the entropy decoding module may be input to the rearrangement module 215.

Like the entropy encoding module, the entropy decoding module 210 may change a codeword allocation table by using a counter or a direct swapping method, and perform entropy decoding based on the changed codeword allocation table.

The entropy decoding module 210 may decode information related to intra-prediction and inter-prediction performed by the encoder. As described above, in a case in which there is certain restriction when intra-prediction and inter-prediction is performed by the video encoder, entropy decoding may be performed based on such restriction to receive information related to intra-prediction and inter-prediction with respect to a current block. The entropy decoding module may perform a decoding operation as described with reference to FIGS. 3 through 8.

The entropy decoding module 210 may decode intra-prediction mode information of a current PU by using a predetermined binary code based on the intra-coding mode decoding method according to the embodiment of the present invention described with reference to FIGS. 3 through 8.

The rearrangement module 215 may rearrange r an entropy-decoded bit stream by the entropy decoding module 210 based on the method of rearrangement in the encoding module. Coefficients in the form of a 1D vector may be reconstructed into coefficients in the form of a 2D block and rearranged. The rearrangement module 215 may be provided with information related to coefficient scanning performed in the encoding module, and perform rearrangement through a method of reversely scanning based on the scanning order performed in the corresponding the encoding module.

The dequantization module 220 may perform dequantization based on a quantization parameter provided from the encoder and the rearranged coefficient value of the block.

The inverse-transform module 225 may perform inverse-OCT and inverse-DST corresponding to the OCT and the DST performed by the transform module on the quantization results performed by the video encoder. The inverse-transform may be performed based on a transmit unit determined by the video encoder. The transform module 115 of the video encoder may selectively perform OCT and DST according to a plurality of information such as a prediction method, a size of a current block, a prediction direction, and the like. The dequantization module 225 of the video decoder may perform inverse transform based on the information transformed by the transform module of the video encoder.

When the transform is performed, the transform may be performed based on coding unit (CU), rather than the transform unit (TU).

The prediction module 230 may generate a prediction block based on the prediction block generation-related information provided from the entropy decoding module 210 and the previously decoded block or picture information provided from the memory 240.

As described above, like the operation in the video encoder, in performing intra-prediction, when a size of a prediction unit (PU) and a size of a transform unit (TU) are equal, intra-prediction for a prediction unit (PU) is performed on based on pixels located on the left of the prediction unit (PU), pixels located on left-upper of the prediction unit (PU), and pixels located on upper of the prediction unit (PU) However, in performing intra-prediction, when a size of a prediction unit (PU) and a size of a transform unit (TU) are different, intra-prediction may be performed by using a reference pixel based on the transform unit (TU). Also, intra-prediction using N×N partition may be used only on a minimum coding unit.

The prediction module 230 may include a prediction unit (PU) discriminating module, an inter-prediction module, and an intra-prediction module. The PU discriminating module may receive various information such as PU information input from the entropy decoding module, prediction mode information of an intra-prediction method, a motion prediction-related information of an inter-prediction method, and the like, input from the entropy decoding module, discriminate PU from a current CU, and discriminate whether a PU is to perform inter-prediction or intra-prediction. The inter-prediction module may perform inter-prediction on a current PU based on information included in at least one picture among a previous picture and a subsequent picture of a current picture including a current PU by using information required for inter-prediction of the current PU provided from the video encoder.

In order to perform inter-prediction, based on CU, which one of a skip mode, a merge mode, and an AMVP mode corresponds to a motion prediction method of a PU included in the corresponding CU may be determined.

The intra-prediction module may generate a prediction block based on pixel information of the current picture. When intra-prediction may be performed on a PU, intra-prediction may be performed based on intra-prediction mode information of the PU provided from the video encoder. The intra-prediction module may include an AIS filter, a reference pixel interpolation unit, and a DC filter. The AIS filter is a part performing filtering on a reference pixel of a current block, and whether to apply the filter may be determined according to a prediction mode of a current PU and applied. AIS filtering may be performed on the reference pixel of the current block by using the prediction mode of the PU and the AIS filter information provided from the video encoder. In a case in which the prediction mode of the current block is a mode in which AIS filtering is not performed, the AIS filter may not be applied.

When the intra-prediction may performed based on a pixel value obtained by interpolating the reference pixel, the reference pixel interpolation module may interpolate the reference pixel to generate a reference pixel below an integer value. When the prediction mode of the current PU is a prediction mode in which a prediction block is generated without interpolating the reference pixel, the reference pixel may not be interpolated. In a case in which the prediction mode of the current block is a DC mode, the DC filter may generate a prediction block through filtering.

The reconstructed block or picture may be provided to the filter module 235. The filter module 235 may include a deblocking filter, an offset compensation unit, and an ALF.

Information regarding whether a deblocking filter has been applied to the corresponding block or picture and information regarding whether a strong filter or a weak filter has been applied if the deblocking filter has been applied may be received from the video encoder. The deblocking filter of the video decoder may receive deblocking filter-related information provided form the video encoder and the video decoder may perform deblocking filtering on the corresponding block. Like in the video encoder, first, vertical deblocking filtering and horizontal deblocking filtering may be performed, and at least one of vertical deblocking and horizontal deblocking may be performed in an overlap portion. Vertical deblocking filtering or horizontal deblocking filtering which has not been performed previously may be performed in a portion in which vertical deblocking filter and horizontal deblocking filtering overlap. Through the deblocking filtering process, parallel processing of the deblocking filtering may be performed.

The offset compensation unit may perform offset compensation on the reconstructed image based on a type of offset compensation applied to the image during encoding, offset value information, and the like.

The ALF may perform filtering based on a value obtained by comparing the image reconstructed after filtering and the original image. Based on information whether ALF has been applied, ALF coefficient information, and the like, provided from the encoder, ALF may be applied to a CU. Such ALF information may be included in a specific parameter set and provided.

The memory 240 may store the reconstructed picture or block so as to be used as a reference picture or reference block, and or provide the reconstructed picture to the output module.

As described above, in the embodiment of the present invention, a coding unit (CU) is used as a term of encoding unit, but it may also be a unit of performing decoding as well as encoding. Hereinafter, an intra-prediction mode encoding/decoding method using two candidate intra-prediction modes according to an embodiment of the present invention described with reference to FIGS. 3 through 8 may be implemented according to functions of each mode described above with reference to FIGS. 1 and 2 and such encoder and decoder may fall within coverage of the present invention.

Figure 3:
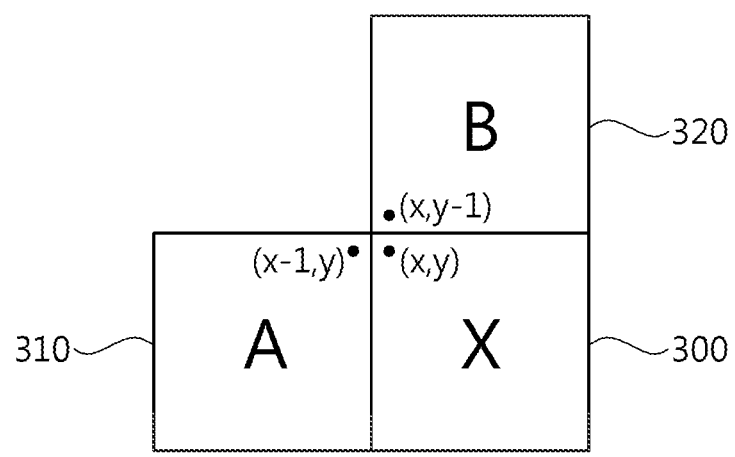
FIG. 3 is a conceptual view illustrating a method for encoding an intra-prediction mode of a current prediction unit (PU) according to another embodiment of the present invention.

FIG. 3 is a conceptual view illustrating a method for encoding an intra-prediction mode of a current prediction unit (PU) according to another embodiment of the present invention.

Referring to FIG. 3, an intra-prediction mode of a current PU may be derived based on an intra-prediction mode of a neighbor PU of the current PU.

Hereinafter, in the embodiment of the present invention, a PU used for deriving an intra-prediction mode of a current PU 300 will be referred to a neighbor PU. When location of a left upper pixel of the current PU is (x, y), the neighbor PU may be a first neighbor PU 310 including a pixel value positioned in (x−1, y) and a second neighbor PU 320 including a pixel value positioned in (x, y−1).

To predict the intra-prediction mode of the current PU 300, when it is determined whether the intra-prediction mode of the current PU 300 and intra-prediction mode of a neighbor PU or to an intra-prediction mode used as a candidate mode of the intra-prediction mode of the current PU 300 in a predetermined order (hereinafter, referred to as "sequential inter-prediction mode") is identical. The intra-prediction mode of the neighbor PU are not available when a neighbor PU does not exist or an inter-prediction mode is used. When they are identical, a predetermined flag information indicating that the intra-prediction mode of the current PU and the intra-prediction mode of a neighbor PU or the sequential inter-prediction mode are identical may be encoded.

Hereinafter, in the embodiment of the present invention, in order to predict intra-prediction mode of the current PU, two intra-prediction modes among intra-prediction mode of a neighbor PU and the sequential intra-prediction mode are used as prediction candidates, and the intra-prediction modes used as prediction candidates will be referred to as a first candidate intra-prediction mode and a second candidate intra-prediction mode.

When a first neighbor PU 310 and a second neighbor PU 320 of the current PU 300 exist intra-prediction is applied to the first neighbor PU 310 and the second neighbor PU 320, and intra-prediction mode values of the first neighbor PU 310 and the second neighbor PU 320 are different, an intra-prediction mode having a smaller value among intra-prediction mode values of the first neighbor PU 310 and the second neighbor PU 320 may be set as a first candidate intra-prediction mode and an intra-prediction mode having a larger value among the intra-prediction mode values of the first neighbor PU 310 and the second neighbor PU 320 may be set as a second candidate intra-prediction mode. Alternatively, an intra-prediction mode of the first neighbor PU may be set as a first candidate inter-prediction mode, and the intra-prediction mode of the second neighbor PU may be set as a second candidate intra-prediction mode.

Hereinafter, when a exists and the intra-prediction is used to predict a prediction mode of the neighbor PU performs, the neighbor PU is called an available neighbor PU.

When both the first neighbor PU 310 and the second neighbor PU 320 of the current PU 300 exist and intra-prediction is applied to the first neighbor PU 310 and the second neighbor PU 320 so both the first neighbor PU 310 and the second neighbor PU 320 are available neighbor Pus but intra-prediction mode values of the neighbor PUs are identical, the intra-prediction mode value of the neighbor PU may be used as a first candidate intra-prediction mode value and one of a planar mode and a DC mode may be sequentially set as a second candidate intra-prediction mode value and used. When the first candidate intra-prediction mode value is the same as the second candidate intra-prediction mode, rather than the planar mode, the second candidate intra-prediction mode value may be set as a planar mode. When the first candidate intra-prediction mode value is the planar mode, the second candidate intra-prediction mode may be set as a DC mode.

In a similar manner, When only one of the first neighbor PU 310 and the second neighbor PU 320 is an available neighbor PU, an intra-prediction mode value of available neighbor PU may be used as a first candidate intra-prediction mode value and one of the planar mode and the DC mode may be used as a second candidate intra-prediction mode value. When the first candidate intra-prediction mode value is not the planar mode, the second candidate intra-prediction mode may be set as the planar mode. When the first candidate intra-prediction mode is the planar mode, the second candidate intra-prediction mode may be set as the DC mode.

When both the first neighbor PU 310 and the second neighbor PU 320 of the current PU 300 are not available, the first candidate intra-prediction mode value may be set as the planar mode and the second candidate intra-prediction mode value may be set as the DC mode.

Namely, in the intra-prediction mode encoding/decoding method using intra-prediction modes of two neighbor blocks according to the embodiment of the present invention, when at least one of the candidate intra-prediction modes is not available, the planar mode or the DC mode is sequentially used as the unavailable candidate intra-prediction mode, whereby both the first candidate intra-prediction mode and the second candidate intra-prediction mode are used as candidate intra-prediction modes.

Figure 4:
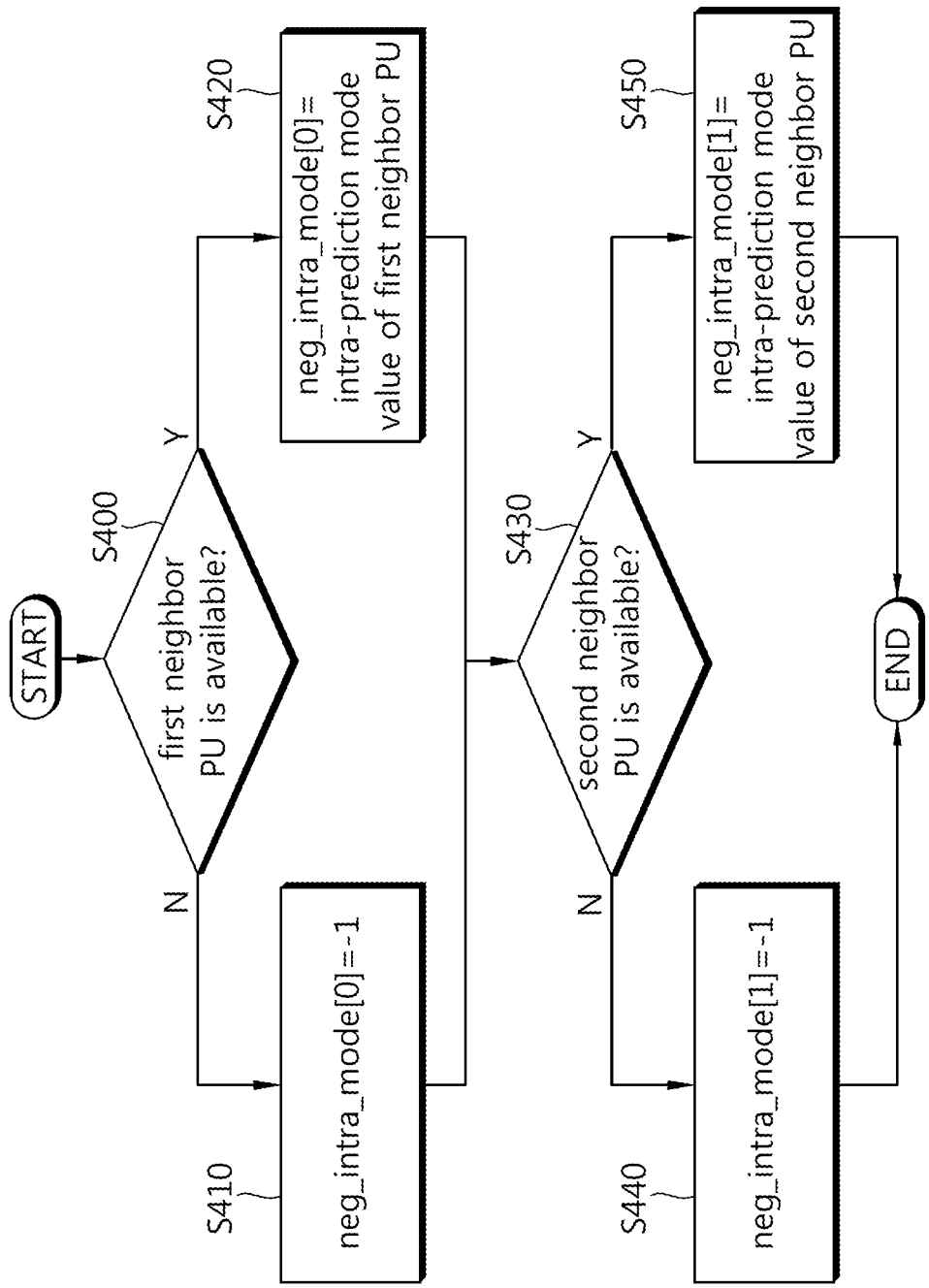
FIG. 4 is a conceptual view illustrating a method of determining availability of neighbor prediction units according to another embodiment of the present invention.

FIG. 4 is a conceptual view illustrating a method of determining availability of neighbor prediction units according to another embodiment of the present invention.

Referring to FIG. 4, it is determined whether a first neighbor PU is available (S400).

When a first neighbor PU exists on the left of a current PU and prediction has been performed based on an intra-prediction mode, it is determined that the first neighbor PU is available.

When the first neighbor PU is not available, a value of an intra-prediction mode of the first neighbor PU is set to −1 (S410).

'−1' is a variable indicating that the first neighbor PU is not available, and availability of the first neighbor PU may also be determined through a different variable.

The mode value of the first neighbor PU may be specified based on a predetermined syntax element. The mode vale of the first intra-prediction mode may be specified as a syntax element neg_intra_mode[0], and when the value of neg_intra_mode[0] is −1, it may be indicate that the first neighbor PU is not available.

When the first neighbor PU is available, an intra-prediction mode value of the first neighbor PU is used as a first candidate intra-prediction mode (S420).

The intra-prediction mode information of the first neighbor PU may be specified as a syntax element neg_intra_mode[0], and the intra-prediction mode value of the first neighbor PU may be stored in the syntax element neg_intra_mode[0] indicating the first candidate intra-prediction mode.

The value of the intra-prediction mode may be expressed as shown in Table 1 below.

Table 1 represents in which intra-prediction modes and numbers corresponding to the intra-prediction modes (hereinafter, referred to as an 'intra-prediction mode number') are mapped

TABLE 1

| Intra prediction mode | Associated names |
| --- | --- |
| 0 | Intra_Planar |
| 1 | Intra_Vertical |

TABLE 1-continued

| Intra prediction mode | Associated names |
|---|---|
| 2 | Intra_Horizontal |
| 3 | Intra_DC |
| Otherwise (4 . . . 34) | Intra_Angular |

Referring to Table 1, the planar mode (Intra_Planar) may be allocated to an intra-prediction number 0, a vertical mode (Intra_Vertical) may be allocated to 1, a horizontal mode (Intra_Horizontal) may be allocated to 2, a DC mode (Intra_DC) may be allocated to 3, and other directional modes (Intra_Anqular) may be allocated to 4 to 34.

In the method of mapping the intra-prediction modes and the intra-prediction mode numbers according to the embodiment of the present invention, the smallest intra-prediction mode number is mapped to the planer mode, and the intra-prediction modes are mapped to the code numbers in order of the vertical mode, the horizontal mode, and the DC mode, whereby the intra-prediction numbers are mapped to small code numbers according to order of frequency of intra-prediction mode. As a result, when binary coding is performed to transmit intra-prediction mode information, the intra-prediction mode information of a PU may be expressed with a smaller number of bits.

It is determined whether a second neighbor PU is available (S430).

When a second neighbor PU of the left of a current PU exists and prediction is performed based on intra-prediction mode, it is determined that the second neighbor PU is available.

In a case in which the second neighbor PU is not available, a value of the intra-prediction mode of the second neighbor PU is set to −1 (S440).

'−1' is a variable indicating that the second neighbor PU is not available, and availability of the second neighbor PU may also be determined through a different variable.

The mode value of the second neighbor PU may be specified based on a predetermined syntax element. The mode vale of the second intra-prediction mode may be specified as a syntax element neg_intra_mode[1], and when the value of neg__intra_mode[1] is −1, it may be indicate that the second neighbor PU is not available.

When the second neighbor PU is available, an intra-prediction mode value of the second neighbor PU is used as a second candidate intra-prediction mode (S450).

The intra-prediction mode information of the second neighbor PU may be specified as a syntax element neg_intra_mode[1], and the intra-prediction mode value of the second neighbor PU may be stored in the syntax element neg_intra_mode[1] indicating the second candidate intra-prediction mode.

Hereinafter, a predetermined syntax element in the embodiment of the present invention may be defined by a different variable or may be combined with different syntax element information so as to be expressed as long as it is not departed from the essence of the present invention. Also, values of mode information allocated to syntax elements are arbitrary and the same information may be expressed by different values.

Table 2 represents the number of intra-prediction mode that may exist according to sizes of PU.

TABLE 2

| log2TrafoSize | intraPredModeNum |
|---|---|
| 2 (4 × 4) | 18 |
| 3 (8 × 8) | 35 |
| 4 (16 × 16) | 35 |
| 5 (32 × 32) | 35 |
| 0 (64 × 64) | 4 |

Referring to Table 2, when a size of transform unit (TU) is 4×4, 18 intra-prediction modes from 0 to 17 are used as mapped in Table 1, and when sizes of TU are 8×8, 16×16, and 32×32, 35 intra-prediction modes from 0 to 34 are used, and when a size of TU is 64×64, four intra-prediction modes from 0 to 3 are used.

In the intra-prediction mode encoding/decoding method using intra-prediction modes of two neighbor blocks, sizes of a current PU and a neighbor PU for predicting an intra-prediction mode of the current PU may be different.

Thus, when available prediction mode values are different in the current PU and the neighbor PU, a first candidate intra-prediction mode value and a second candidate intra-prediction mode value of a neighbor PU should be changed based on a prediction mode available in the current PU in order to obtain the first candidate intra-prediction mode value and the second candidate intra-prediction mode value.

Figure 5:
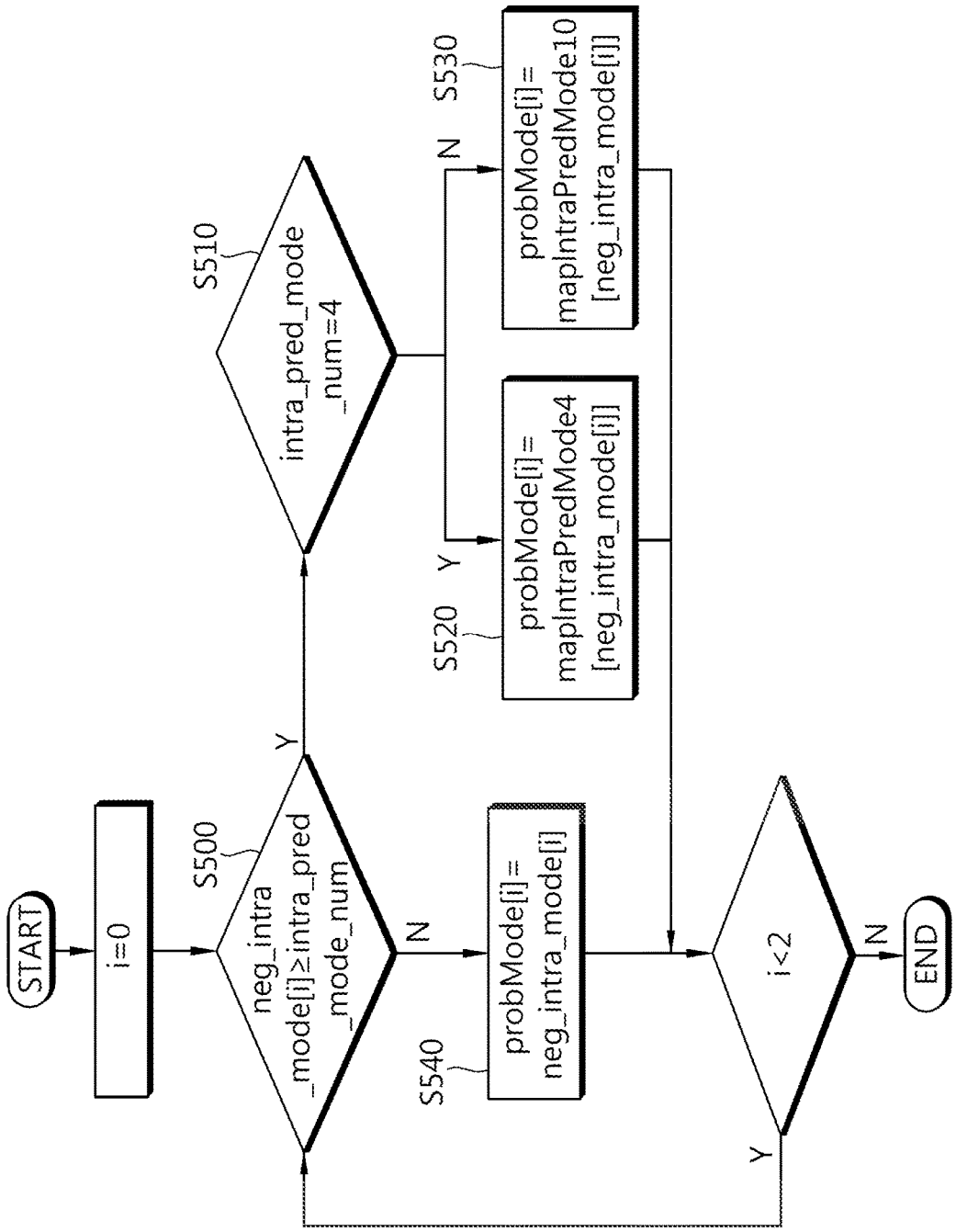
FIG. 5 is a flow chart illustrating a method of changing an intra-prediction mode of a neighbor prediction unit based on a current prediction unit according to another embodiment of the present invention.

FIG. 5 is a flow chart illustrating a method of changing an intra-prediction mode of a neighbor prediction unit based on a current PU according to another embodiment of the present invention.

Referring to FIG. 5, it is determined whether a value of a candidate intra-prediction mode is greater than or equal to the number of available intra-prediction modes of the current PU (S500).

By determining whether the intra-prediction mode value of the first neighbor PU or the intra-prediction mode value of the second neighbor PU is greater than or equal to the number of available intra-prediction mode modes of the current PU, whether to change the intra-prediction mode value of the first neighbor PU or the intra-prediction mode of the second neighbor PU may be determined.

A syntax element neg_intra_mode[i] may be an intra-prediction mode value of a neighbor PU and a syntax element intra_pred_mode_num may be the number of intra-prediction modes available in the current PU.

When an intra-prediction mode value of the first neighbor PU or the intra-prediction mode value of the second neighbor PU is greater than or equal to the number of available intra-prediction modes of the current PU, it is determined whether the number of available intra-prediction modes of the current PU is 4 (S510).

By determining the number of available intra-prediction modes of the current PU, an intra-prediction mode value of the first neighbor PU or the intra-prediction mode value of the second neighbor PU may be changed according to the available intra-prediction mode of the current PU.

In step S510, whether the number of available intra-prediction modes of the current PU is 4 is determined for the description purpose, and whether the number of available intra-prediction modes of the current PU is 18 may be determined and a follow-up procedure may be performed.

When the number of available intra-prediction modes of the current PU is 4, an intra-prediction mode value of the first neighbor PU or an intra-prediction mode value of the second neighbor PU may be changed based on a predetermined mapping table in which an available intra-prediction mode of a current PU and an intra-prediction mode value of a first neighbor PU or an intra-prediction mode value of a second neighbor PU.

Table 3 and Table 4 below are intra-prediction mode mapping tables according to an embodiment of the present invention.

intra-prediction mode value of the second neighbor PU is changed to at least one of ten prediction modes (S530).

In steps S520 and S530, based on the predetermined intra-prediction mapping table described in Table 3 or Table 4, the intra-prediction mode value of the neighbor PU may be mapped to at least one of intra-prediction modes of the available current PU.

probMode[i] may be used as a syntax element representing an intra-prediction mode value of the first neighbor PU or an intra-prediction mode value of the second neighbor PU.

TABLE 3

|  | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| mapIntraPredMode4[ ] | 0 | 1 | 2 | 3 | 0 | 0 | 1 | 0 | 2 | 2 | 0 | 0 | 1 | 1 | 0 | 0 | 2 | 2 |
| mapIntraPredMode10[ ] | 0 | 1 | 2 | 3 | 4 | 5 | 6 | 7 | 8 | 9 | 0 | 0 | 0 | 0 | 0 | 0 | 0 | 0 |
|  | 18 | 19 | 20 | 21 | 22 | 23 | 24 | 25 | 26 | 27 | 28 | 29 | 30 | 31 | 32 | 33 | 34 |  |
| mapIntraPredMode4[ ] | 0 | 0 | 0 | 0 | 1 | 1 | 1 | 0 | 0 | 0 | 0 | 2 | 2 | 2 | 2 | 0 | 0 |  |
| mapIntraPredMode10[ ] | 0 | 4 | 5 | 5 | 1 | 1 | 6 | 6 | 7 | 4 | 8 | 8 | 2 | 2 | 9 | 9 | 0 |  |

TABLE 4

|  | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| mapIntraPredMode4[ ] | 0 | 1 | 2 | 3 | 3 | 3 | 1 | 3 | 2 | 2 | 3 | 3 | 1 | 1 | 3 | 3 | 2 | 2 |
| mapIntraPredMode10[ ] | 0 | 1 | 2 | 3 | 4 | 5 | 6 | 7 | 8 | 9 | 3 | 3 | 3 | 3 | 3 | 3 | 3 | 3 |
|  | 18 | 19 | 20 | 21 | 22 | 23 | 24 | 25 | 26 | 27 | 28 | 29 | 30 | 31 | 32 | 33 | 34 |  |
| mapIntraPredMode4[ ] | 3 | 3 | 3 | 3 | 1 | 1 | 1 | 3 | 3 | 3 | 3 | 2 | 2 | 2 | 2 | 3 | 3 |  |
| mapIntraPredMode10[ ] | 3 | 4 | 5 | 5 | 1 | 1 | 6 | 6 | 7 | 4 | 8 | 8 | 2 | 2 | 9 | 9 | 3 |  |

Referring to Table 3 and Table 4, in a case in which the number of available prediction modes of a current PU is 4, an intra-prediction mode value of a neighbor PU may be mapped to an available prediction mode of the current PU based on a value of the intra-prediction mode derived by a syntax element mapIntraPredMode4[ ]. Also, in a case in which the number of available prediction modes of a current PU is 18, an intra-prediction mode value of a neighbor PU may be mapped to an available prediction mode of the current PU based on a value of the intra-prediction mode derived by a syntax element mapintraPredMode10[ ].

The intra-prediction mode mapping table of Table 3 is a mapping table generated such that many intra-prediction mode values are mapped to mode 0 (planar mode) and the intra-prediction mode mapping table of Table 4 is a mapping table generated such that many intra-prediction mode values are mapped to mode 3 (DC mode). Namely when Table 3 is used as an intra-prediction mode table, an intra-prediction mode value of the first neighbor PU or an intra-prediction mode value of the second neighbor PU is mapped to the planar mode much more than other modes, and when Table 4 is used as an intra-prediction mode table, an intra-prediction mode values of the first neighbor PU or an intra-prediction mode values of the second neighbor PU is mapped to the DC mode much more than other modes.

Based on the intra-prediction mode mapping table, the intra-prediction mode value of the first neighbor PU or the intra-prediction mode value of the second neighbor PU is changed to at least one of four prediction modes (S520).

Based on the intra-prediction mode mapping table, the intra-prediction mode value of the first neighbor PU or the When the intra-prediction mode value of the first neighbor PU or the intra-prediction mode intra-prediction mode value of the second neighbor PU is smaller than the number of available intra-prediction modes of the current PU, the intra-prediction mode value of the first neighbor PU or the intra-prediction mode value of the second neighbor PU is used as information for predicting an intra-prediction mode value of the current PU as it is (S540).

When the intra-prediction mode value of the first neighbor PU or the intra-prediction mode intra-prediction mode value of the second neighbor PU is smaller than the number of available intra-prediction modes of the current PU, the intra-prediction mode value of the first neighbor PU or the intra-prediction mode value of the second neighbor PU may be used as it is, without being changed.

Figure 6:
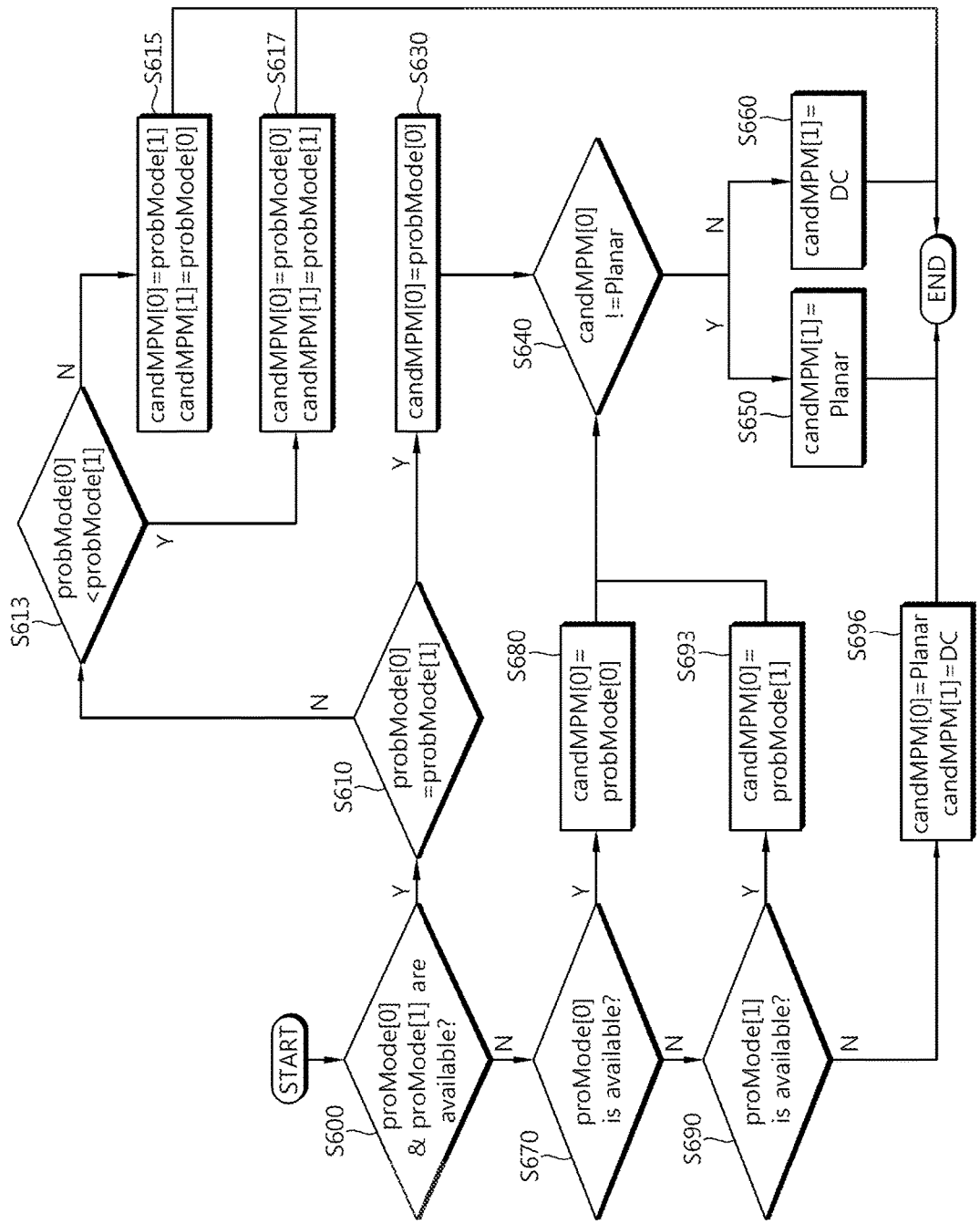
FIG. 6 is a flow chart illustrating a method of generating a first candidate intra prediction mode and a second intra prediction mode according to another embodiment of the present invention.

FIG. 6 is a flow chart illustrating a method of generating a first candidate intra prediction mode and a second intra prediction mode according to another embodiment of the present invention.

Referring to FIG. 6, it is determined whether the intra-prediction mode value of the first neighbor PU and the intra-prediction mode value of the second neighbor PU are available (S600).

Based on the number of intra-prediction modes used in the current PU based on the procedure described above with reference to FIG. 5, whether the intra-prediction mode value of the first neighbor PU or the intra-prediction mode value of the second neighbor PU reset by using the intra-prediction mode mapping table is used as a first candidate intra-prediction mode value or a second candidate intra-prediction mode value based on neighbor PU of the current PU may be determined.

Namely, in step S600, whether the intra-prediction mode value of the first neighbor PU or the intra-prediction mode value of the second neighbor PU is available to be used as a first candidate intra-prediction mode or a second candidate intra-prediction mode. When at least one of the first candidate intra-prediction mode and the second candidate intra-prediction mode is not derived from the neighbor PU, one of sequential intra-prediction modes may be used as the first candidate intra-prediction mode or the second candidate intra-prediction mode.

It is determined whether the first intra-prediction mode value of the first neighbor PU and the intra-prediction mode value of the second neighbor PU are identical (S610).

When the first intra-prediction mode value of the first neighbor PU and the intra-prediction mode value of the second neighbor PU are not identical, it is determined whether the intra-prediction mode value of the first neighbor PU is greater than the intra-prediction mode value of the second neighbor PU (S613).

When the intra-prediction mode value of the first neighbor PU is greater than the intra-prediction mode value of the second neighbor PU, the intra-prediction mode value of the second neighbor PU is set as the first candidate intra-prediction mode, and the intra-prediction mode value of the first neighbor PU is set as the second candidate intra-prediction mode (S615).

When the intra-prediction mode value of the first neighbor PU is smaller than the intra-prediction mode value of the second neighbor PU, the intra-prediction mode value of the first neighbor PU is set as the first candidate intra-prediction mode, and the intra-prediction mode value of the second neighbor PU is set as the second candidate intra-prediction mode (S617).

A syntax element candMPM[0] indicates the first candidate intra-prediction mode and a syntax element candMPM[1] indicates the second candidate intra-prediction mode.

When the intra-prediction mode value of the first neighbor PU or the intra-prediction mode value of the second neighbor PU are identical, the intra-prediction mode value of the first neighbor PU or the intra-prediction mode value of the second neighbor PU is set as a first candidate intra-prediction mode (S630) and it is determined whether the first candidate intra-prediction mode is a planar mode (S640).

As described above, when only one of the first candidate intra-prediction mode and the second candidate intra-prediction mode exists, the planar mode or the DC mode may be used one of the first candidate intra-prediction mode and the second candidate intra-prediction mode by using the sequential intra-prediction mode.

In the intra-prediction mode allocating method according to the embodiment of the present invention, since two different intra-prediction modes are used as the first candidate intra-prediction mode and the second candidate intra-prediction mode, when the first candidate intra-prediction mode is not the planar mode, the second candidate intra-prediction mode is set as the planar mode (S650), and when the first candidate intra-prediction mode is a planar mode, the DC mode may be set as the second candidate intra-prediction mode and used (S660).

It is determined whether only the intra-prediction mode value of the first neighbor PU is available (S670).

When only the intra-prediction mode value of the first neighbor PU is available, the intra-prediction mode value of the first neighbor PU is set as the first candidate intra-prediction mode value (S680).

It is determined whether only the intra-prediction mode value of the second neighbor PU is available (S690).

When only the intra-prediction mode value of the second neighbor PU is available, the intra-prediction mode value of the second neighbor PU is set as the second candidate intra-prediction mode value (S693).

When only one of the two neighbor PUs is available in S670 to S693, an intra-prediction mode value of the available PU may be set as the first candidate intra-prediction mode.

When only one of the two neighbor PUs is available, the second candidate intra-prediction mode may be determined based on the procedure described above in steps S640 to S660.

When neither of the two neighbor PUs are available, the planar mode may be set as the first candidate intra-prediction mode and the DC mode may be set as the second candidate intra-prediction mode (S696).

When neither of the two neighbor PUs are available, the planar mode may be set as the first candidate intra-prediction mode and the DC mode may be set as the second candidate intra-prediction mode by using the sequential intra-prediction mode.

Figure 7:
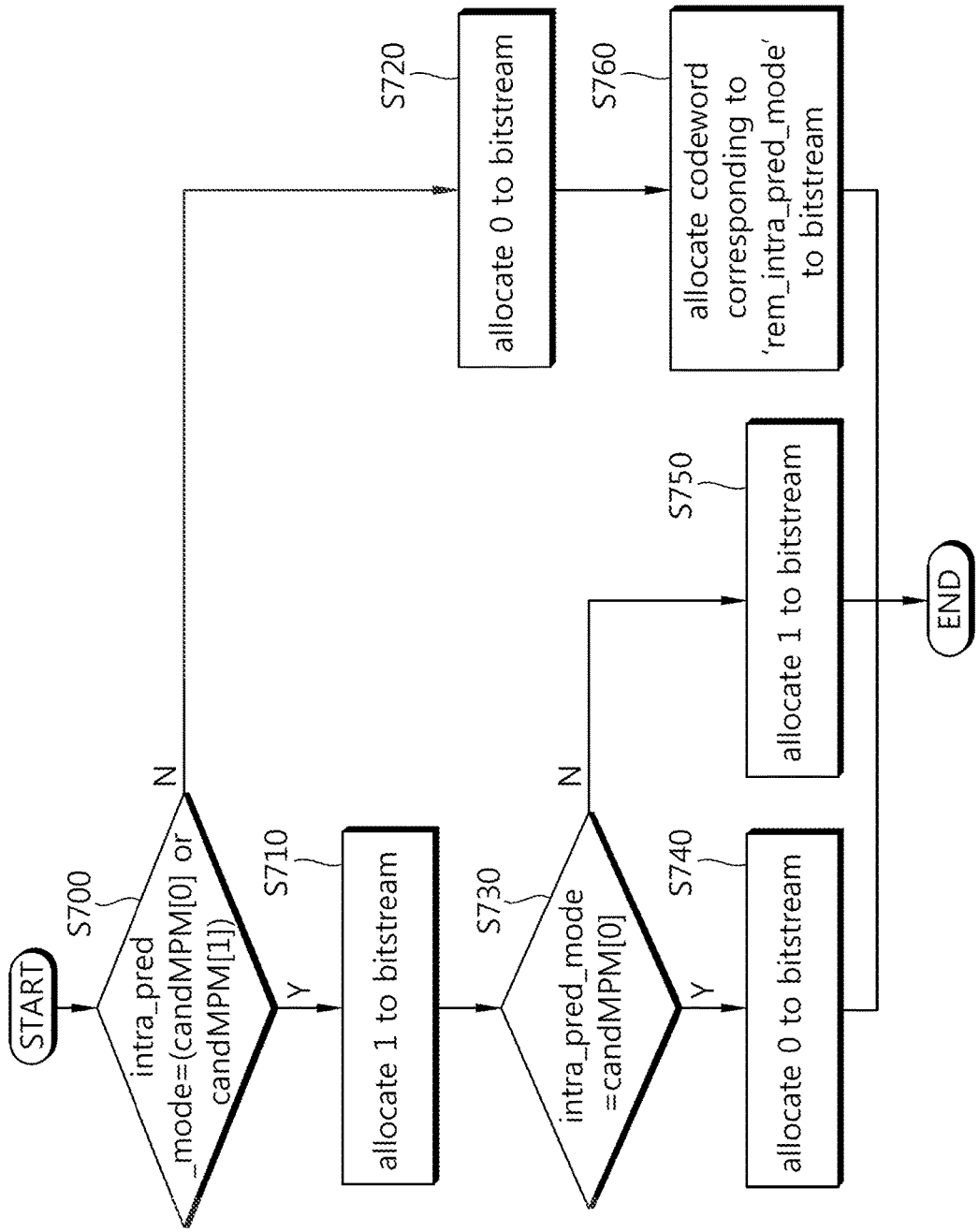
FIG. 7 is a flow chart illustrating a method of mapping information of a current prediction mode to codeword according to another embodiment of the present invention.

FIG. 7 is a flow chart illustrating a method of mapping information of a current prediction mode to codeword according to another embodiment of the present invention.

Referring to FIG. 7, it is determined whether an intra-prediction mode of a current PU and a first candidate intra-prediction mode or a second intra-prediction mode are identical (S700).

When the intra-prediction mode of the current PU and the first candidate intra-prediction mode or the second intra-prediction mode are identical, 1 is allocated as codeword information (S710). When the intra-prediction mode of the current PU and the first candidate intra-prediction mode or the second intra-prediction mode are not identical, 0 is allocated as codeword information (S720).

It is determined whether the intra-prediction mode of the current PU and the first candidate intra-prediction mode are identical (S730). When the intra-prediction mode of the current PU and the first candidate intra-prediction mode are identical, 0 is additionally allocated as codeword information (S740), and when the intra-prediction mode of the current PU and the first candidate intra-prediction mode are different, 1 is additionally allocated as codeword information (S750).

When the intra-prediction mode of the current PU and the first candidate intra-prediction mode are identical or the second candidate intra-prediction mode are not identical so 0 is allocated as codeword information, rem_intra_pred_mode (hereinafter, it is used as a term having the same meaning for the other remaining intra-prediction modes) in which the other remaining intra-prediction mode information is mapped to codewords is additionally allocated to a codeword in order to express intra-prediction mode information of the current PU (S760).

Table 5 represents mapping between intra-prediction modes of current PU and codewords.

TABLE 5

| Code words | Current mode (intra_pred_mode) |
|---|---|
| 10 | candMPM[0] |
| 11 | candMPM[1] |
| 0 + rem | rem_intra_pred_mode |

Referring to Table 5; when the intra-prediction mode of the current PU and the first candidate intra-prediction mode or the second candidate intra-prediction mode is identical, a prediction mode of the current PU may be known with 2-bit codeword, and when the intra-prediction mode of the current PU and the first candidate intra-prediction mode or the second candidate intra-prediction mode is not identical, an intra-prediction mode of the current PU may be known based on a bit value allocated to rem_intra_pred_mode by 1 bit.

Codewords allocated to rem_intra_pred_mode as a remaining intra-prediction mode may be changed. to change the remaining intra-prediction mode, a mode value of a prediction mode of a current PU and the first candidate intra-prediction mode value and the second candidate intra-prediction mode are compared, and any one of the first candidate intra-prediction mode value and the second candidate intra-prediction mode which has a value smaller than the prediction mode of the current PU is exclusive from the current mapping table, whereby the codeword of the intra-prediction mode allocated to the current remaining intra-prediction mode may be mapped short.

In the intra-prediction mode information determining method according to the embodiment of the present invention, in case of using a transform unit (TU) having a size of 64×64, types of intra-prediction mode of a current PU and codewords may be mapped as shown in Table 6.

TABLE 6

| Code words | Current mode (intra_pred_mode) |
|---|---|
| 00 | Planar |
| 01 | Ver |
| 10 | Hor |
| 11 | DC |

Referring to Table 6, when the TU having the size of 64×64 is used, four types of intra-prediction mode are available, and thus, intra-prediction mode information of the current PU may be expressed by fixed 2 bits without a process of determining whether an intra-prediction mode of the current PU and a first candidate intra-prediction mode and a second candidate intra-prediction mode are identical.

Figure 8:
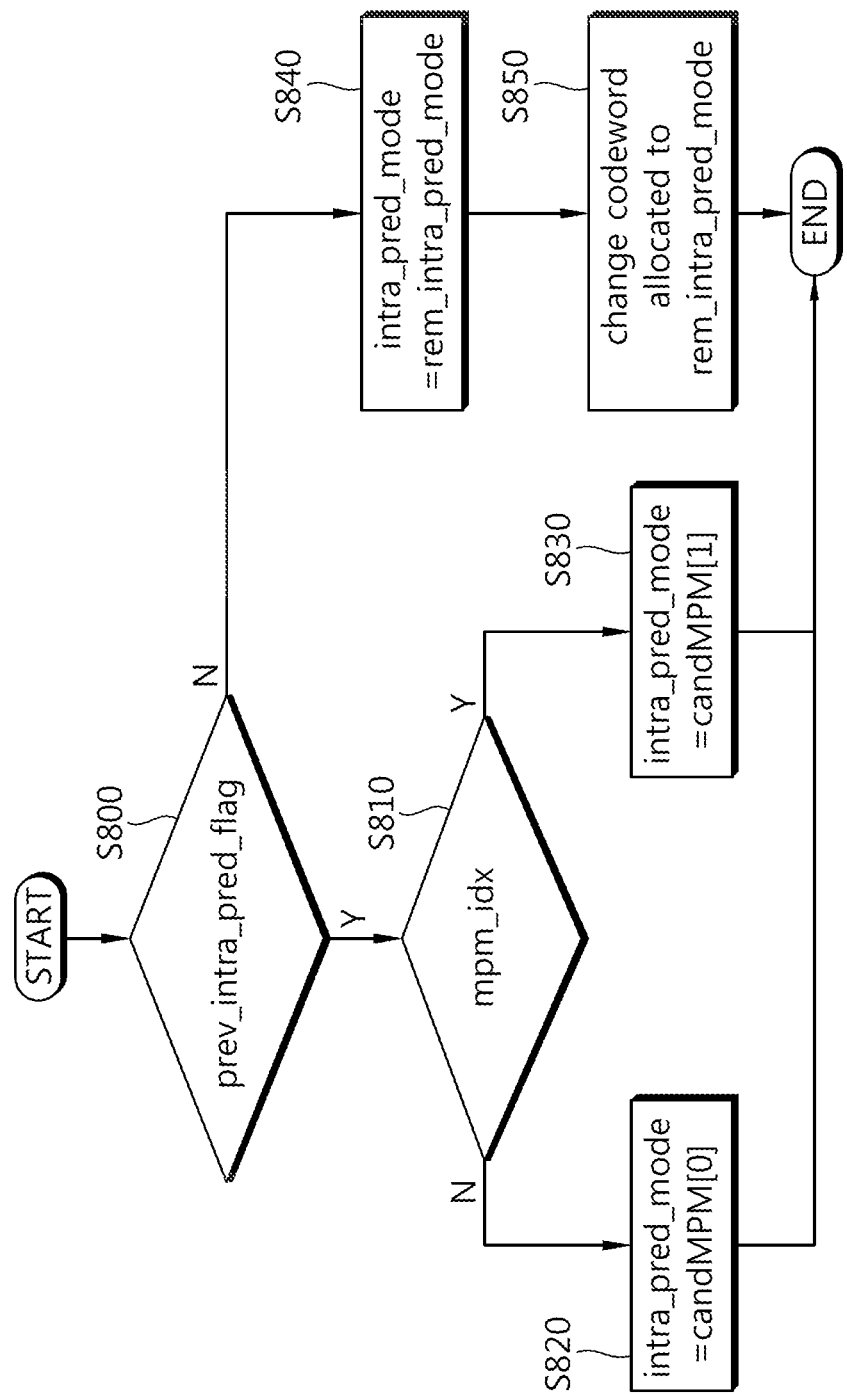
FIG. 8 is a flow chart illustrating a method of decoding a current intra-prediction mode according to another embodiment of the present invention.

FIG. 8 is a flow chart illustrating a method of decoding a current intra-prediction mode according to another embodiment of the present invention.

Referring to FIG. 8, it is determined whether an intra-prediction mode of a current PU is identical to a first candidate intra-prediction mode or a second candidate intra-prediction mode (S800).

In order to determine whether the intra-prediction mode of the current PU is identical to the first candidate intra-prediction mode or the second candidate intra-prediction mode, predetermined flag information prev_intra_pred_flag indicating whether the intra-prediction mode of the current PU is identical to the first candidate intra-prediction mode or the second candidate intra-prediction mode may be used. When prev_intra_pred_flag is 1, it indicates that the intra-prediction mode of the current PU is identical to the first candidate intra-prediction mode or the second candidate intra-prediction mode, and when prev_intra_pred_flag is 0, it indicates that the intra-prediction mode of the current PU is not identical to the first candidate intra-prediction mode or the second candidate intra-prediction mode.

When prev_intra_pred_flag is 1, intra-prediction mode information of the current PU may be set by using mpm_idx indicating which the first candidate intra-prediction mode or the second candidate intra-prediction mode is identical to the intra-prediction mode of the current PU.

When mpm_idx is determined to be 0 (S810), the intra-prediction mode of the current PU may be determined as the first candidate intra-prediction mode (S820), and when mpm_idx is determined to be 1, the intra-prediction mode of the current PU may be determined as the second candidate intra-prediction mode (S830)

When prev_intra_pred_flag is 0, intra-prediction mode information of the current PU may be decoded based on rem_intra_pred_mode indicating remaining intra-prediction mode information (S840).

Namely, the decoder may receive the codeword value described in Table 4, and decode intra-prediction mode information of the current PU allocated to the corresponding codeword.

A codeword allocated to rem_intra_pred_mode is changed (S850).

Like in the encoder as described above, the decoder may allocate a new codeword to a remaining intra-prediction mode value. A mode value of a prediction mode of the current PU and the first candidate intra-prediction mode value and the second candidate intra-prediction mode are compared, and any one of the first candidate intra-prediction mode value and the second candidate intra-prediction mode which has a value smaller than the prediction mode of the current PU is exclusive from the current mapping table, and the codeword may be newly allocated from the new current mapping table excluded any one of the first candidate intra-prediction mode value and the second candidate intra-prediction mode.

In the intra-prediction mode information determining method according to the embodiment of the present invention, when the transform unit (TU) having the size of 64×64 as described above is used, if types of the intra-prediction modes of the current PU and codewords are mapped with 5, intra-prediction mode information of the current PU may be expressed by fixed 2 bits without a process of determining whether an intra-prediction mode of the current PU and a first candidate intra-prediction mode and a second candidate intra-prediction mode are identical.

While embodiments have been shown and described above, it will be apparent to those skilled in the art that modifications and variations could be made without departing from the spirit and scope of the present invention as defined by the appended claims.

What is claimed is:

1. A method of decoding a video signal, comprising:
deriving a plurality of intra prediction mode candidates by using intra prediction modes derived from an upper neighboring prediction unit and a left neighboring prediction unit adjacent to a current prediction unit;
obtaining a residual sample for the current prediction unit;
determining whether an intra prediction mode of the current prediction unit is the same as at least one of the plurality of intra prediction mode candidates based on n-bit information;
when the intra prediction mode of the current block is the same as at least one of the plurality of intra prediction mode candidates, decoding the intra prediction mode of the current prediction unit by determining which intra prediction mode candidate among the plurality of intra prediction mode candidates is identical to the intra prediction mode of the current prediction unit, based on additional m-bit information;
when the intra prediction mode of the current prediction unit is not identical to at least one of the plurality of intra prediction mode candidates, decoding the intra prediction mode of the current prediction unit based on additional bits representing remaining intra prediction mode information;

obtaining a prediction sample of the current prediction unit based on the intra prediction mode of the current prediction unit; and obtaining a reconstructed sample of the current prediction unit based on the prediction sample and the residual sample, wherein when the intra prediction modes derived from the upper neighboring prediction unit and the left neighboring prediction unit are different, a first intra-prediction mode candidate and a second intra-prediction mode candidate among the intra prediction mode candidates are determined without comparing values of the intra prediction mode derived from the upper neighboring prediction unit and the intra prediction mode derived from the left neighboring prediction unit.

2. A method of encoding a video signal, comprising:
determining an intra prediction mode of a current prediction unit included in an encoding target image;
obtaining a prediction sample for the current prediction unit based on the determined intra prediction mode;
obtaining a residual sample of the current prediction unit based on the prediction sample;
encoding the residual sample;
deriving a plurality of intra prediction mode candidates by using intra prediction modes derived from an upper neighboring prediction unit and a left neighboring prediction unit adjacent to the current prediction unit;
encoding n-bit information indicating whether the intra prediction mode of the current prediction unit is identical to at least one of the plurality of intra prediction mode candidates; and
when the intra prediction mode of the current prediction unit is identical to at least one of the plurality of intra prediction mode candidates, encoding m-bit information indicating which intra prediction mode candidate among the plurality of intra prediction mode candidates is identical to the intra prediction mode of the current prediction unit;
when the intra prediction mode of the current prediction unit is not identical to at least one of the plurality of intra prediction mode candidates, encoding additional bits indicating remaining intra prediction mode information,
wherein when the intra prediction modes derived from the upper neighboring prediction unit and the left neighboring prediction unit are different, a first intra-prediction mode candidate and a second intra-prediction mode candidate are determined without comparing values of the intra prediction mode derived from the upper neighboring prediction unit and the intra prediction mode derived from the left neighboring prediction unit.

3. A non-transitory computer-readable recording medium storing a bitstream that is generated by a method of encoding a video signal, wherein the method comprises
determining an intra prediction mode of a current prediction unit included in an encoding target image;
obtaining a prediction sample for the current prediction unit based on the determined intra prediction mode;
obtaining a residual sample of the current prediction unit based on the prediction sample;
encoding the residual sample;
deriving a plurality of intra prediction mode candidates by using intra prediction modes derived from an upper neighboring prediction unit and a left neighboring prediction unit adjacent to the current prediction unit;
encoding n-bit information indicating whether the intra-prediction mode of the current prediction unit is identical to at least one of the plurality of intra prediction mode candidates;
when the intra prediction mode of the current prediction unit is identical to at least one of the plurality of intra prediction mode candidates, encoding m-bit information indicating which intra prediction mode candidate among the plurality of intra prediction mode candidates is identical to the intra prediction mode of the current prediction unit; and
when the intra prediction mode of the current prediction unit is not identical to at least one of the plurality of intra prediction mode candidates, encoding additional bits indicating remaining intra prediction mode information,
wherein when the intra prediction modes derived from the upper neighboring prediction unit and the left neighboring prediction unit are different, a first intra-prediction mode candidate and a second intra-prediction mode candidate are determined without comparing values of the intra prediction mode derived from the upper neighboring prediction unit and the intra prediction mode derived from the left neighboring prediction unit.

* * * * *

UNITED STATES PATENT AND TRADEMARK OFFICE
CERTIFICATE OF CORRECTION

PATENT NO. : 11,973,933 B1
APPLICATION NO. : 17/971930
DATED : April 30, 2024
INVENTOR(S) : Sun Young Lee Page 1 of 1

It is certified that error appears in the above-identified patent and that said Letters Patent is hereby corrected as shown below:

On the Title Page

Column 1, under item (51):
Insert --¶(30) Foreign Application Priority Data
Oct. 6, 2011 (KR) 10-2011-0101816--

Column 2, in (57) Abstract, Lines 5-6:
Replace "information:" with --information;--

In the Claims

On Column 24, Line 10, under Claim 3:
Replace "comprises" with --comprises:--

Signed and Sealed this
Eleventh Day of June, 2024

Katherine Kelly Vidal
*Director of the United States Patent and Trademark Office*